United States Patent [19]

Owen et al.

[11] Patent Number: 5,077,251
[45] Date of Patent: Dec. 31, 1991

[54] CONTROL OF MULTISTAGE CATALYST REGENERATION WITH BOTH PARTIAL AND FULL CO COMBUSTION

[75] Inventors: Hartley Owen, Belle Mead, N.J.; Paul H. Schipper, Wilmington, Del.

[73] Assignee: Mobil Oil Corporation, Fairfax, Va.

[21] Appl. No.: 554,308

[22] Filed: Jul. 17, 1990

[51] Int. Cl.$^5$ .................. B01J 38/36; B01J 38/38; B01J 38/34; C10G 11/00

[52] U.S. Cl. .................. 502/42; 208/113; 208/164; 502/40; 502/43

[58] Field of Search .................. 502/40–44; 208/164, 113

[56] References Cited

U.S. PATENT DOCUMENTS

| | | | |
|---|---|---|---|
| 4,211,636 | 7/1980 | Gross et al. | 208/164 |
| 4,211,637 | 7/1980 | Gross et al. | 208/164 |
| 4,283,273 | 8/1981 | Owen | 502/40 |
| 4,448,753 | 5/1984 | Gross et al. | 208/164 |
| 4,812,430 | 3/1989 | Child | 502/41 |
| 4,849,091 | 7/1989 | Cabrera et al. | 208/113 |
| 4,875,994 | 10/1989 | Haddad et al. | 208/164 |
| 4,917,790 | 4/1990 | Owen | 208/113 |
| 5,011,592 | 4/1991 | Owen et al. | 208/113 |

Primary Examiner—Paul E. Konopka
Attorney, Agent, or Firm—A. J. McKillop; C. J. Speciale; Richard D. Stone

[57] ABSTRACT

A process for controlled, multi-stage regeneration of FCC catalyst is disclosed. A modified high efficiency catalyst regenerator, with a fast fluidized bed coke combustor, dilute phase transport riser, and second fluidized bed regenerates the catalyst in at least two stages. The primary stage of regeneration is in the coke combustor. Second stage catalyst regeneration occurs in the second fluidized bed. The amount of combustion air added to, and conditions in, the coke combustor are controlled to limit CO combustion, while the second stage of regeneration, in the second fluidized bed, achieves complete CO combustion. Controlled multi-stage regeneration reduces steaming or deactivation of catalyst during regeneration, increase coke burning capacity, and reduces NOx emissions.

10 Claims, 3 Drawing Sheets

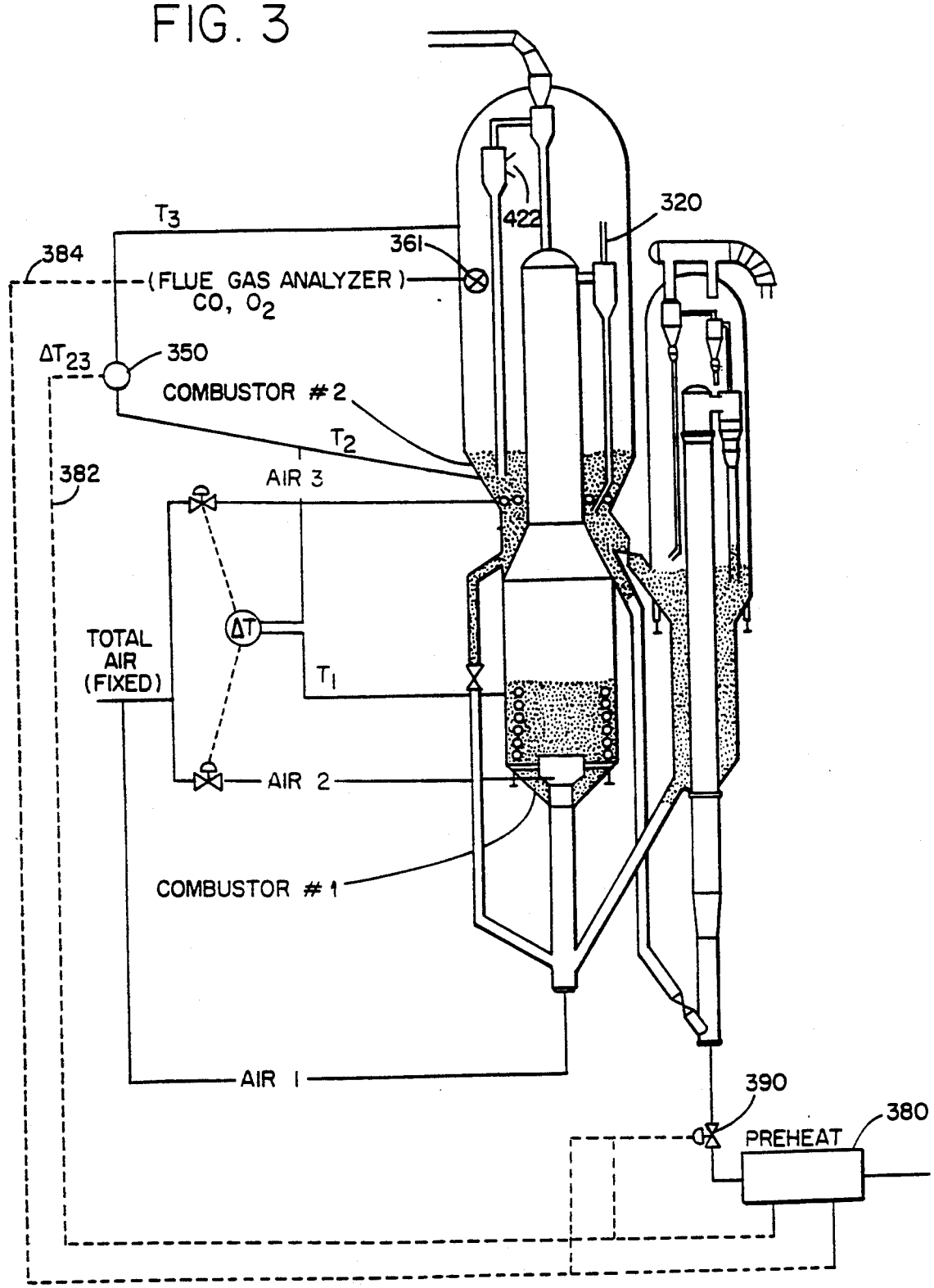

CONTROL OF MULTISTAGE CATALYST REGENERATION WITH BOTH PARTIAL AND FULL CO COMBUSTION

BACKGROUND OF THE INVENTION

1. Field of the Invention

The field of the invention is regeneration of coked cracking catalyst in a fluidized bed.

2. Description of Related Art

Catalytic cracking is the backbone of many refineries. It converts heavy feeds to lighter products by cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

There are two main variants of the catalytic cracking process: moving bed and the far more popular and efficient fluidized bed process.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425C.-600C., usually 460C.-560C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500C.-900C., usually 600C.-750C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. The trend of development of the fluid catalytic cracking (FCC) process has been to all riser cracking and use of zeolite catalysts.

Riser cracking gives higher yields of valuable products than dense bed cracking. Most FCC units now use all riser cracking, with hydrocarbon residence times in the riser of less than 10 seconds, and even less than 5 seconds.

Zeolite-containing catalysts having high activity and selectivity are now used in most FCC units. These catalysts work best when coke on the catalyst after regeneration is less than 0.2 wt %, and preferably less than 0.05 wt %.

To regenerate FCC catalysts to these low residual carbon levels, and to burn CO completely to $CO_2$ within the regenerator (to conserve heat and minimize air pollution) many FCC operators add a CO combustion promoter metal to the catalyst or to the regenerator.

U.S. Pat. Nos. 4,072,600 and 4,093,535, which are incorporated by reference, teach use of combustion-promoting metals such as Pt, Pd, Ir, Rh, Os, Ru and Re in cracking catalysts in concentrations of 0.01 to 50 ppm, based on total catalyst inventory.

As the process and catalyst improved, refiners attempted to use the process to upgrade a wider range of feedstocks, in particular, feedstocks that were heavier, and also contained more metals and sulfur than had previously been permitted in the feed to a fluid catalytic cracking unit.

These heavier, dirtier feeds have placed a growing demand on the regenerator. Processing resids has exacerbated existing problem areas in the regenerator, steam, temperature and NOx. These problems will each be reviewed in more detail below.

Steam

Steam is always present in FCC regenerators although it is known to cause catalyst deactivation. Steam is not intentionally added, but is invariably present, usually as absorbed or entrained steam from steam stripping of catalyst or as water of combustion formed in the regenerator.

Poor stripping leads to a double dose of steam in the regenerator, first from the adsorbed or entrained steam and second from hydrocarbons left on the catalyst due to poor catalyst stripping. Catalyst passing from an FCC stripper to an FCC regenerator contains hydrogen-containing components, such as coke or unstripped hydrocarbons adhering thereto. This hydrogen burns in the regenerator to form water and cause hydrothermal degradation.

U.S. Pat. No. 4,336,160 to Dean et al, which is incorporated by reference, attempts to reduce hydrothermal degradation by staged regeneration Steaming of catalyst becomes more of a problem as regenerators get hotter. Higher temperatures accelerate the deactivating effects of steam.

Temperature

Regenerators are operating at higher and higher temperatures. This is because most FCC units are heat balanced, that is, the endothermic heat of the cracking reaction is supplied by burning the coke deposited on the catalyst. With heavier feeds, more coke is deposited on the catalyst than is needed for the cracking reaction. The regenerator gets hotter, and the extra heat is rejected as high temperature flue gas. Many refiners severely limit the amount of resid or similar high CCR feeds to that amount which can be tolerated by the unit. High temperatures are a problem for the metallurgy of many units, but more importantly, are a problem for the catalyst. In the regenerator, the burning of coke and unstripped hydrocarbons leads to much higher surface temperatures on the catalyst than the measured dense bed or dilute phase temperature. This is discussed by Occelli et al in Dual-Function Cracking Catalyst Mixtures, Ch. 12, Fluid Catalytic Cracking, ACS Symposium Series 375, American Chemical Society, Washington, D.C., 1988.

Some regenerator temperature control is possible by adjusting the $CO/CO_2$ ratio produced in the regenerator. Burning coke partially to CO produces less heat than complete combustion to CO2. Control of CO/CO2 ratios is fairly straightforward in single, bubbling bed regenerators, by limiting the amount of air that is added. It is far more difficult to control CO/CO2 ratios when multi-stage regeneration is involved.

U.S. Pat. No. 4,353,812 to Lomas et al, which is incorporated by reference, discloses cooling catalyst from a regenerator by passing it through the shell side of a heat-exchanger with a cooling medium through the tube side. The cooled catalyst is recycled to the regeneration zone. This approach will remove heat from the regenerator, but will not prevent poorly, or even well, stripped catalyst from experiencing very high surface or localized temperatures in the regenerator.

The prior art also used dense or dilute phase regenerated fluid catalyst heat removal zones or heat-exchangers that are remote from, and external to, the regenerator vessel to cool hot regenerated catalyst for return to the regenerator. Examples of such processes are found in U.S. Pat. Nos. 2,970,117 to Harper; 2,873,175 to Owens; 2,862,798 to McKinney; 2,596,748 to Watson et al; 2,515,156 to Jahnig et al; 2,492,948 to Berger; and 2,506,123 to Watson.

NOx

Burning of nitrogenous compounds in FCC regenerators has long led to creation of minor amounts of NOx, some of which were emitted with the regenerator flue gas. Usually these emissions were not much of a problem because of relatively low temperature, a relatively reducing atmosphere from partial combustion of CO and the absence of catalytic metals like Pt in the regenerator which increase NOx production.

Unfortunately, the trend to heavier feeds usually means that the amount of nitrogen compounds on the coke will increase and that NOx emissions will increase. Higher regenerator temperatures also tend to increase NOx emissions. It would be beneficial, in many refineries, to have a way to burn at least a large portion of the nitrogenous coke in a relatively reducing atmosphere, so that much of the NOx formed could be converted into N2 within the regenerator. Unfortunately, existing multi-stage regenerator designs can not be run with two stages of regeneration, both operating with partial CO combustion, i.e., with a reducing atmosphere.

High Efficiency Regenerator

Most new FCC units use a high efficiency regenerator, which uses a fast fluidized bed coke combustor to burn most of the coke from the catalyst, and a dilute phase transport riser above the coke combustor to afterburn CO to CO2 and achieve a limited amount of additional coke combustion. Hot regenerated catalyst and flue gas are discharged from the transport riser, separated, and the regenerated catalyst collected as a second bed, a bubbling dense bed, for return to the FCC reactor and recycle to the coke combustor to heat up incoming spent catalyst.

Such regenerators are now widely used. They typically are operated to achieve complete CO combustion within the dilute phase transport riser. They achieve one stage of regeneration, i.e., essentially all of the coke is burned in the coke combustor, with minor amounts being burned in the transport riser. The residence time of the catalyst in the coke combustor is on the order of a few minutes, while the residence time in the transport riser is on the order of a few seconds, so there is generally not enough residence time of catalyst in the transport riser to achieve any significant amount of coke combustion.

Catalyst regeneration in such high efficiency regenerators is essentially a single stage of regeneration, in that the catalyst and regeneration gas and produced flue gas remain together from the coke combustor through the dilute phase transport riser. Almost no further regeneration of catalyst occurs downstream of the coke combustor, because very little air is added to the second bed, the bubbling dense bed used to collect regenerated catalyst for recycle to the reactor or the coke combustor. Usually enough air is added to fluff the catalyst, and allow efficient transport of catalyst around the bubbling dense bed. Less than 5%, and usually less than 1%, of the coke combustion takes place in the second dense bed.

Such units are popular in part because of their efficiency, i.e., the fast fluidized bed, with recycle of hot regenerated catalyst, is so efficient at burning coke that the regenerator can operate with only half the catalyst inventory required in an FCC unit with a bubbling dense bed regenerator.

With the trend to heavier feedstocks, the catalyst regenerator is frequently pushed to the limit of its coke burning capacity. Addition of cooling coils, as discussed above in the Temperature discussion, helps some, but causes additional problems. High efficiency regenerators run best when run in complete CO combustion mode, so attempts to shift some of the heat of combustion to a downstream CO boiler are difficult to implement.

The use of a high efficiency regenerator to achieve staged catalyst regeneration will allow some reduction in NOx emissions, while some recovery of SOx will still be possible. Other benefits also flow from multistage operation, such as reduced steaming of catalyst, because of lower average temperatures, and less damage from metals, because at least some of the regeneration is conducted in a somewhat reducing atmosphere which retards formation of highly oxidized forms of vanadium. One such regenerator is disclosed in U.S. Pat. No. 4,849,091, which is incorporated herein by reference.

The control method disclosed in U.S. Pat. No. 4,849,091 is similar to the use of a dT controller to limit afterburning in a single dense bed regenerator. Basically, the '091 patent keeps air to the coke combustor constant, and changes the air to the second stage, or second dense bed based on a dilute phase temperature, or dT, which indicates afterburning. There is only partial combustion of coke in the coke combustor, and partial CO combustion in the coke combustor, with relatively complete coke and CO combustion in the second dense bed. The reducing flue gas from the coke combustor (with a CO2/CO ratio of from 0.7 to 2.0) is combined with the flue gas from the second dense bed, which operates with substantially complete CO combustion to produce a flue gas with at least 0.5% 02. The two flue gas streams are combined to form flue gas containing a CO2/CO ratio from 1 to 5.

In order to obtain maximum benefit from such a regenerator it is important to have a method of controlling the addition of combustion air which will tolerate relatively large changes in coke make. It would be even more beneficial if a control method were available which allowed the relative amounts of coke burned in each zone to be kept constant, regardless of variations in coke make.

We realized that there was a need for a better way to run a high efficiency regenerator, so that several stages of catalyst regeneration could be achieved using most of the existing hardware.

We wanted a way to adjust the unit operation that would allow swings in coke make to be dealt with either by changing the coke burning rates in both the coke combustor and the second dense bed, or at least in the coke combustor. This is because the coke combustor is the most vigorously fluidized, and most robust place in the regenerator for coke combustion. The fast fluidized bed region is not plagued by the presence of many large bubbles, unlike the second dense bed of many high efficiency regenerators. The fast fluidized bed region is essentially entirely active, while much, and perhaps even a majority, of a bubbling dense phase fluidized bed is inactive. For these reasons we wanted to have a way to keep the operation of the second stage of regeneration relatively constant, while adjusting coke burning in the fast fluidized bed coke combustor.

We discovered ways to achieve the benefits of multi-stage regeneration of catalyst in a high efficiency regenerator, without the drawbacks, discussed above, associated with trying to accommodate changes in coke make by varying the combustion air added to the second stage or second dense bed of such a regenerator.

We also developed a powerful method of controlling the amount of carbon burned in the coke combustor, which allowed us to independently vary the amount of coke burning in the coke combustor and the amount of afterburning in the dilute phase transport riser above the coke combustor.

We also found a way to maximize the capacity of such a regenerator, by keeping relatively constant both the primary and secondary air addition rates, and adjusting the amount of CO combustion promoter and/or the amount of feed preheat and/or the feed rate. In this way, the unit can be operated at maximum throughput, and still controlled.

BRIEF SUMMARY OF THE INVENTION

Accordingly, the present invention provides in a process for regenerating spent fluidized catalytic cracking catalyst comprising: partially regenerating said spent cracking catalyst in a primary regeneration zone, comprising a fast fluidized bed coke combustor and a superimposed dilute phase transport riser, by charging said spent catalyst to said fast fluidized bed coke combustor having an inlet for spent catalyst, an inlet for recycled regenerated catalyst and an inlet for primary regeneration gas, to produce partially regenerated catalyst and flue gas comprising at least 1.0 mole % CO, which are passed up into the dilute phase transport riser and discharged therefrom to form a flue gas rich stream comprising at least 1.0 mole % CO and a catalyst rich stream comprising partially regenerated catalyst; completing the regeneration of said partially regenerated catalyst in a secondary regeneration zone comprising a second fluidized bed adapted to receive said partially regenerated catalyst and having means for adding additional regeneration gas to said second fluidized bed in an amount sufficient to complete the regeneration of said catalyst and produce regenerated catalyst and secondary flue gas; the improvement comprising: monitoring at least one flue gas composition or a differential temperature indicating afterburning in a flue gas stream or a mixture of said flue gas streams and controlling the amount of primary regeneration gas to said fast fluidized bed coke combustor to maintain constant said monitored flue gas composition or differential temperature.

In another embodiment, the present invention provides in a process for regenerating spent fluidized catalytic cracking catalyst comprising: partially regenerating said spent cracking catalyst in a primary regeneration zone, comprising a fast fluidized bed coke combustor and a superimposed dilute phase transport riser, by charging said spent catalyst to said fast fluidized bed coke combustor having a bed temperature and an inlet for spent catalyst, an inlet for recycled regenerated catalyst and an inlet for primary regeneration gas, to produce partially regenerated catalyst and flue gas comprising at least 1.0 mole % CO, which are passed up into the dilute phase transport riser and discharged therefrom to form a flue gas rich stream having a temperature and comprising at least 1.0 mole % CO and a catalyst rich stream comprising partially regenerated catalyst; completing the regeneration of said partially regenerated catalyst in a secondary regeneration zone comprising a second fluidized bed having a bed temperature and adapted to receive said partially regenerated catalyst and having means for adding additional regeneration gas to said second fluidized bed in an amount sufficient to complete the regeneration of said catalyst and produce regenerated catalyst and secondary flue gas having a temperature; the improvement comprising: monitoring at least one flue gas stream or a mixture of said flue gas streams to determine a composition or a differential temperature indicating afterburning, and controlling the total amount of primary and secondary regeneration gas to maintain constant said monitored flue gas composition or differential temperature; and apportioning the regeneration gas between said primary and secondary stages of regeneration to maintain constant a difference in temperature between said fast fluidized and said second fluidized bed.

In yet another embodiment, the present invention provides in a process for regenerating spent fluidized catalytic cracking catalyst comprising: partially regenerating said spent cracking catalyst in a primary regeneration zone, comprising a fast fluidized bed coke combustor and a superimposed dilute phase transport riser, by charging said spent catalyst to said fast fluidized bed coke combustor having a bed temperature and an inlet for spent catalyst, an inlet for recycled regenerated catalyst and an inlet for primary regeneration gas, to produce partially regenerated catalyst and flue gas comprising at least 1.0 mole % CO, which are passed up into the dilute phase transport riser and discharged therefrom to form a flue gas rich stream having a temperature and comprising at least 1.0 mole % CO and a catalyst rich stream comprising partially regenerated catalyst; completing the regeneration of said partially regenerated catalyst in a secondary regeneration zone comprising a second fluidized bed having a bed temperature and adapted to receive said partially regenerated catalyst and having means for adding additional regeneration gas to said second fluidized bed in an amount sufficient to complete the regeneration of said catalyst and produce regenerated catalyst and secondary flue gas having a temperature; the improvement comprising: controlling the amount of regenerated catalyst recycled to the coke combustor from the second fluidized bed to control the temperature of said coke combustor and limit the amount of coke burned in said coke combustor to 10 to 90% of the coke on said spent catalyst; and controlling the amount of regeneration gas added to said coke combustor and to said dilute phase transport riser to limit afterburning and produce a flue gas from said dilute phase transport riser containing at least 1.0 mole % CO.

In a further embodiment, which maximizes the throughput of an FCC unit, the present invention provides in a fluidized catalytic cracking process wherein a heavy feed is preheated and charged at a feed rate to an FCC reactor where said feed contacts a source of hot regenerated catalyst in a cracking reactor to produce cracked products and spent catalyst containing coke, the cracked products are withdrawn as products and the spent catalyst regenerated in a catalyst regeneration means to remove the net coke make by partially regenerating said spent cracking catalyst in a primary regeneration zone, comprising a fast fluidized bed coke combustor and a superimposed dilute phase transport riser, by charging said spent catalyst to said fast fluidized bed coke combustor having an inlet for spent catalyst, an inlet for recycled regenerated catalyst and an inlet for primary regeneration gas, to produce partially regenerated catalyst and flue gas comprising at least 1.0 mole % CO, which are passed up into the dilute phase transport riser and discharged therefrom to form a flue gas rich stream comprising at least 1.0 mole % CO and a catalyst rich stream comprising partially regenerated catalyst; completing the regeneration of said partially regenerated catalyst in a secondary regeneration zone comprising a second fluidized bed adapted to receive said partially regenerated catalyst and having means for adding additional regeneration gas to said second fluidized bed in an amount sufficient to complete the regeneration of said catalyst and produce regenerated catalyst and secondary flue gas; the improvement comprising: adding a constant amount of regeneration gas to said regenerator; monitoring at least one flue gas composition or temperature or differential temperature indicating afterburning in a flue gas stream or a mixture of said flue gas streams and controlling the coke make of said cracking reactor by adjusting said feed preheat, said feed rate, or both, to change the coke make and maintain constant said monitored flue gas composition or temperature or differential temperature.

DETAILED DESCRIPTION OF THE DRAWINGS

FIG. 3 shows the same regenerator wherein a flue gas analyzer controller, and/or a delta T controller, changes feed preheat and/or feed rate.

DETAILED DESCRIPTION

Figure 1:
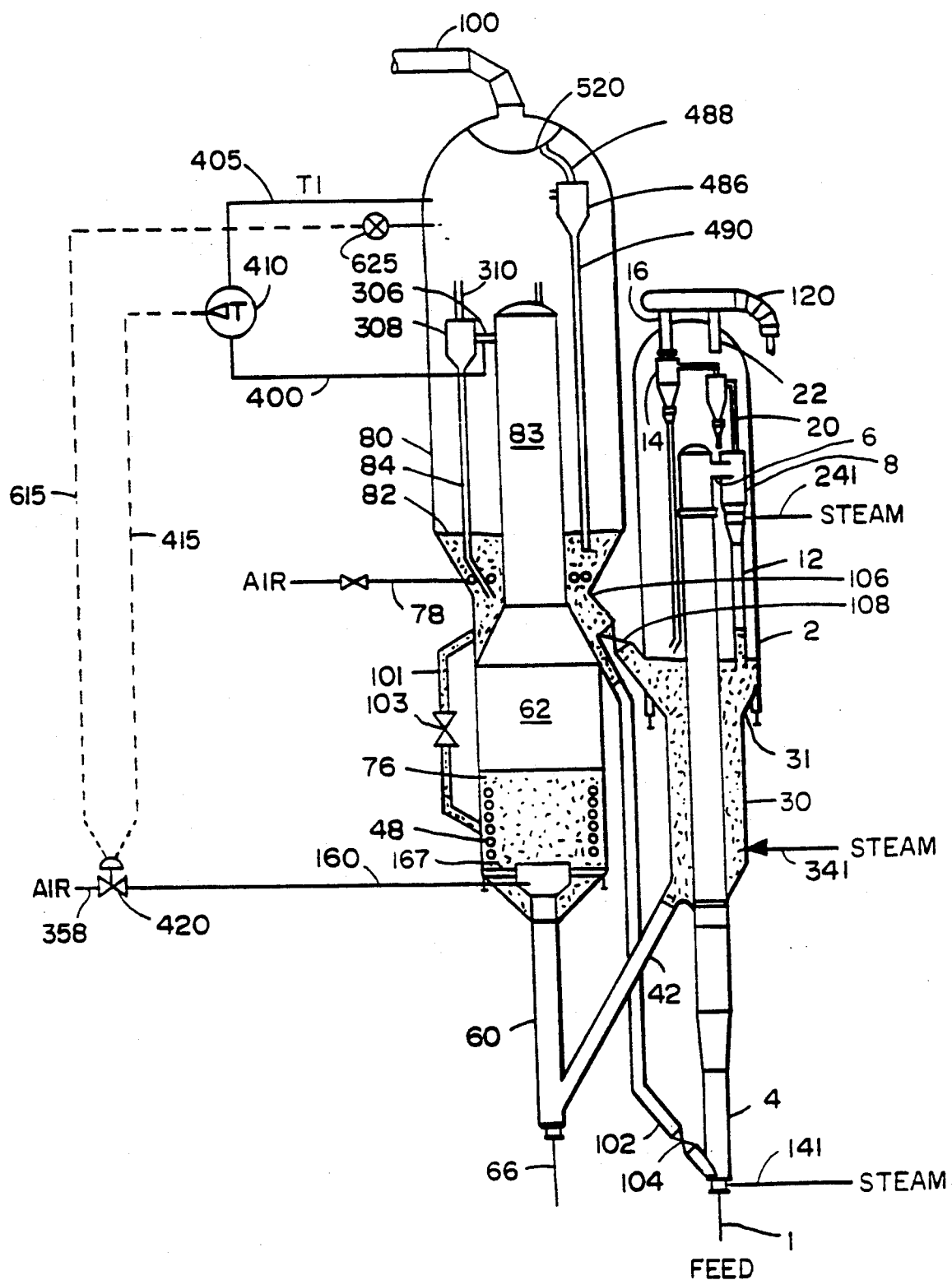
FIG. 1 is a simplified schematic view of one embodiment of the invention using flue gas composition, or a delta T indicating afterburning, to control air addition to the coke combustor of a multistage FCC high efficiency regenerator.

The present invention can be better understood by reviewing it in conjunction with the Figures, which illustrate preferred high efficiency regenerators incorporating the process control scheme of the invention. The present invention is applicable to other types of high efficiency regenerators, such as those incorporating additional catalyst flue gas separation means in various parts of the regenerator.

In all figures the FCC reactor section is the same. A heavy feed is charged via line 1 to the lower end of a riser cracking FCC reactor 4. Hot regenerated catalyst is added via standpipe 102 and control valve 104 to mix with the feed. Preferably, some atomizing steam is added via line 141 to the base of the riser, usually with the feed. With heavier feeds, e. g. , a resid, 2-10 wt. % steam may be used. A hydrocarbon-catalyst mixture rises as a generally dilute phase through riser 4. Cracked products and coked catalyst are discharged via riser effluent conduit 6 into first stage cyclone 8 in vessel 2. The riser top temperature, the temperature in conduit 6, ranges between about 480 and 615 C. (900 and 1150 F.), and preferably between about 538 and 595 C. (1000 and 1050 F.). The riser top temperature is usually controlled by adjusting the catalyst to oil ratio in riser 4 or by varying feed preheat.

Cyclone 8 separates most of the catalyst from the cracked products and discharges this catalyst down via dipleg 12 to a stripping zone 30 located in a lower portion of vessel 2. Vapor and minor amounts of catalyst exit cyclone 8 via gas effluent conduit 20 second stage reactor cyclones 14. The second cyclones 14 recovers some additional catalyst which is discharged via diplegs to the stripping zone 30.

The second stage cyclone overhead stream, cracked products and catalyst fines, passes via effluent conduit 16 and line 120 to product fractionators not shown in the figure. Stripping vapors enter the atmosphere of the vessel 2 and may exit this vessel via outlet line 22 or by passing through an annular opening in line 20, not shown, i.e. the inlet to the secondary cyclone can be flared to provide a loose slip fit for the outlet from the primary cyclone.

The coked catalyst discharged from the cyclone diplegs collects as a bed of catalyst 31 in the stripping zone 30. Dipleg 12 is sealed by being extended into the catalyst bed 31. The dipleg from the secondary cyclones 14 is sealed by a flapper valve, not shown.

Many cyclones, 4 to 8, are usually used in each cyclone separation stage. A preferred closed cyclone system is described in U.S. Pat. No. 4,502,947 to Haddad et al, which is incorporated by reference.

The FCC reactor system described above is conventional and forms no part of the present invention.

Stripper 30 is a "hot stripper." Hot stripping is preferred, but not essential. Spent catalyst is mixed in bed 31 with hot catalyst from the regenerator. Direct contact heat exchange heats spent catalyst. The regenerated catalyst, which has a temperature from 55 C. (100F.) above the stripping zone 30 to 871 C. (1600 F.), heats spent catalyst in bed 31. Catalyst from regenerator 80 enters vessel 2 via transfer line 106, and slide valve 108 which controls catalyst flow. Adding hot, regenerated catalyst permits first stage stripping at from 55 C. (100 F.) above the riser reactor outlet temperature and 816 C. (1500 F.). Preferably, the first stage stripping zone operates at least 83 C. (150 F.) above the riser top temperature, but below 760 C. (1400 F.).

In bed 31 a stripping gas, preferably steam, flows countercurrent to the catalyst. The stripping gas is preferably introduced into the lower portion of bed 31 by one or more conduits 341. The stripping zone bed 31 preferably contains trays or baffles not shown.

High temperature stripping removes coke, sulfur and hydrogen from the spent catalyst. Coke is removed because carbon in the unstripped hydrocarbons is burned as coke in the regenerator. The sulfur is removed as hydrogen sulfide and mercaptans. The hydrogen is removed as molecular hydrogen, hydrocarbons, and hydrogen sulfide. The removed materials also increase the recovery of valuable liquid products, because the stripper vapors can be sent to product recovery with the bulk of the cracked products from the riser reactor. High temperature stripping can reduce coke load to the regenerator by 30 to 50% or more and remove 50-80% of the hydrogen as molecular hydrogen, light hydrocarbons and other hydrogen-containing compounds, and remove 35 to 55% of the sulfur as hydrogen sulfide and mercaptans, as well as a portion of nitrogen as ammonia and cyanides.

Although a hot stripping zone is shown in FIG. 1, the present invention is not, per se, the hot stripper. The process of the present invention may also be used with conventional strippers, or with long residence time steam strippers, or with strippers having internal or external heat exchange means.

Although not shown in FIG. 1, an internal or external catalyst stripper/cooler, with inlets for hot catalyst and fluidization gas, and outlets for cooled catalyst and stripper vapor, may also be used where desired to cool catalyst stripped catalyst before it enters the regenerator. Although much of the regenerator is conventional (the coke combustor, dilute phase transport riser and second dense bed) several significant departures from conventional operation occur.

The FCC catalyst is regenerated in two stages, i.e., both in the coke combustor/transport riser and in the second fluidized bed, which is preferably a dense bed or bubbling fluidized bed. Partial CO combustion is maintained in the first stage while the second stage of catalyst regeneration operates in complete CO combustion mode.

The stripped catalyst passes through the conduit 42 into regenerator riser 60. Air from line 66 and stripped catalyst combine and pass up through an air catalyst disperser 74 into coke combustor 62 in regenerator 80. In bed 62, combustible materials, such as coke on the catalyst, are burned by contact with air or oxygen containing gas.

The amount of air or oxygen containing gas added via line 66, to the base of the riser mixer 60, is preferably constant and preferably restricted to 10-95% of total air addition to the preferably restricted to 10-95% of total air addition to the first stage of regeneration. Additional air, preferably 5-50% of total air, is added to the coke combustor via line 160 and air ring 167. The partitioning of the first stage air, between the riser mixer 60 and the air ring 167 in the coke combustor, can be fixed or controlled by a differential temperature, e.g., temperature rise in riser mixer 60. The total amount of air addition to the first stage, i.e., the regeneration in the coke combustor and riser mixer is controlled to maintain only partial coke removal and only partial CO combustion. The control method will be discussed in more detail later.

The temperature of fast fluidized bed 76 in the coke combustor 62 may be, and preferably is, increased by recycling some hot regenerated catalyst thereto via line 101 and control valve 103. If temperatures in the coke combustor are too high, some heat can be removed via catalyst cooler 48, shown as tubes immersed in the fast fluidized bed in the coke combustor. Very efficient heat transfer can be achieved in the fast fluidized bed, so it may be beneficial to both heat the coke combustor (by recycling hot catalyst to it) and to cool the coke combustor (by using catalyst cooler 48) at the same time. Neither catalyst heating by recycle, nor catalyst cooling, by the use of a heat exchange means, per se form any part of the present invention.

In coke combustor 62 the combustion air, regardless of whether added via line 66 or 160, fluidizes the catalyst in bed 76, and subsequently transports the catalyst continuously as a dilute phase through the regenerator riser 83. The dilute phase passes upwardly through the riser 83, through riser outlet 306 into primary regenerator cyclone 308. Catalyst is discharged down through dipleg 84 to form a second relatively dense bed of catalyst 82 located within the regenerator 80.

While most of the catalyst passes down through the dipleg 84, the flue gas and some catalyst pass via outlet 310 into the dilute phase region above the second fluidized bed. An additional stage of separation of catalyst from the combined flue gas flue gas streams is achieved in secondary cyclone 486, with catalyst recovered via dipleg 490 and flue gas discharged via gas exhaust line 488 to plenum 520. Flue gas, with a greatly reduced solids content is discharged from the regenerator 80 via line 100.

The use of cyclones as shown in FIG. 1 to handle the flue gas is a preferred but not essential method of dealing with the flue gas streams from two stages of coke combustion. It is not essential to the practice of the present invention to have a cyclone on the transport riser outlet, nor to isolate flue gas from the first stage of combustion from the second stage of combustion. A third stage of cyclone separation, not shown, may be preferred in some installations.

The hot, regenerated catalyst discharged from the various cyclones forms a second fluidized bed 82, which is hotter than any other fluid bed in the regenerator, and hotter than the stripping zone 30. Bed 82 is at least 55 C. (100 F.) hotter than stripping zone 31, and preferably at least 83 C. (150 F.) hotter.

The regenerator temperature is, at most, 871 C. (1600 F.) to prevent deactivating the catalyst. Preferably, some hot regenerated catalyst is withdrawn from dense bed 82 and passed via line 106 and control valve 108 into dense bed of catalyst 31 in stripper 30. Hot regenerated catalyst passes through line 102 and catalyst flow control valve 104 for use in heating and cracking of fresh feed.

Partial CO combustion is achieve in the first stage by control of temperature and residence time and by control of the air addition rate. There will always be large amounts of coke on catalyst exiting the riser. Combustion air to the second stage is maintained at a constant rate, or changed only infrequently to suit changing conditions. The second stage flue gas, e.g., CO or 02 content controls the amount of air added to the first stage.

If the CO content of the second stage flue gas increases to, e.g., 0.5 or 1 or 2 mole % CO, in response to a major change in feed characteristics or operating conditions, this means that the second fluidized bed is not able to completely afterburn all the CO produced in the second fluidized bed. The delta T observed by dT controller 410 will drop. The dT is sensed via thermocouples 400 and 405 in the outlet to the transport riser and the dilute phase region above the second fluidized bed. A change in temperature, delta T, indicates afterburning. An appropriate signal is then sent via control line 415 to alter air flow across valve 420 and regulate air addition to the coke combustor via line 160. The air flow via line 78 to the upper dense bed is fixed, i.e., a conventional control means admits a fixed volume of air.

If second stage flue gas CO content decreases, e.g., to 0.05 mole %, or too much oxygen breaks through the second stage, this means the second stage is not being worked hard enough, so the amount of air added to the first stage will be decreased to shift more of the coke burning load to the second stage of regeneration. In this way a relatively simple and reliable control scheme (use of a flue gas composition or delta T indicative of a composition of flue gas above the second fluidized bed) can accommodate normal minor changes in operation, and even be adjusted to deal with major changes in operation.

The FIG. 1 embodiment controls air addition to the coke combustor a delta T controller or a flue gas analyzer controller 625 to directly measure the flue gas composition and send a signal via signal transmission means 615 to valve 420 to control air flow to the coke combustor. It is also possible to use a flue gas temperature, rather than a dT, to control unit operation in many instances. This is because extremely high temperatures usually indicate afterburning. Use of a differential temperature controller will usually be preferred by most refiners, because it is a sensitive and reliable control method.

The FIG. 1 embodiment provides a reliable, straightforward way to run the unit while maintaining partial CO combustion in the first stage and complete CO combustion in the second stage of the regenerator.

It will be beneficial in many refineries if the relatively amount of coke burning in both the primary and secondary stage of the regenerator can be directly controlled. The FIG. 2 embodiment provides a way to apportion and control the relative amount of coke burning that occurs in each stage of regeneration.

Figure 2:
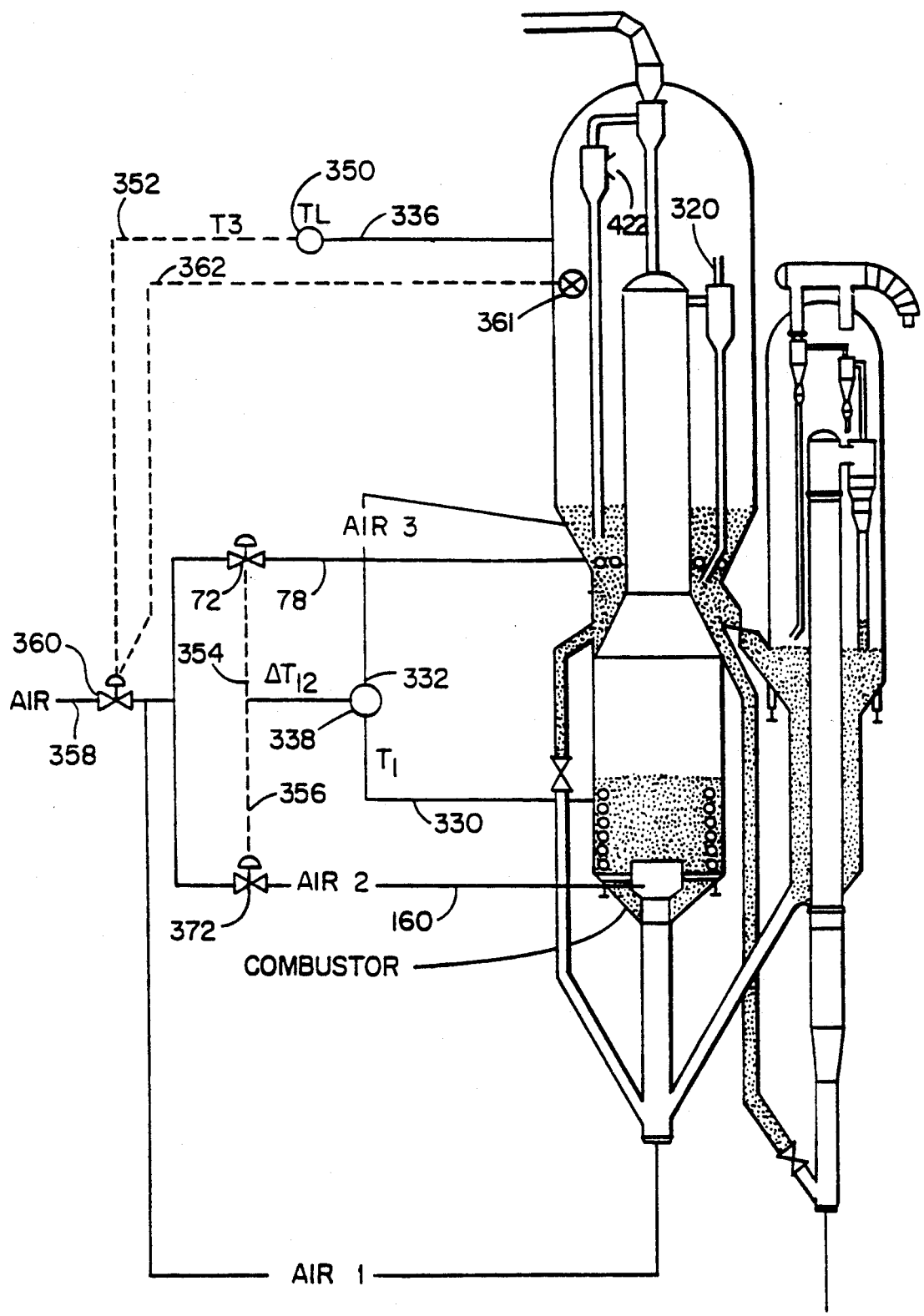
FIG. 2 is a simplified view of the same regenerator using a flue gas analyzer, or temperature, to control total air flow, and a fluid bed dT controller to apportion air between the fluidized beds.

The FIG. 2 embodiment uses most of the hardware from the FIG. 1 embodiment, i.e., the regenerator flue gas streams are combined into a single flue gas stream. The difference in the FIG. 2 embodiment is simultaneous adjustment of both primary and secondary air. This can be seen more easily in conjunction with a review of the Figure. Elements which correspond to FIG. 1 element have the same reference numerals, and are not discussed. FIG. 2 also includes, besides reference numerals, symbols indicating temperature differences, e.g., $dT_{12}$ means that a signal is developed indicative of the temperature difference between temperature 1 and temperature 2.

The amount of air added to the riser mixer is fixed, for simplicity, but this is merely to simplify the following analysis. The riser mixer air is merely part of the primary air, and could vary with any variations in flow of air to the coke combustor. It is also possible to operate the regenerator with no riser mixer at all, in which case the spent catalyst, recycled regenerated catalyst, and primary air are all added directly to the coke combustor. The riser mixer is preferred.

The control scheme will first be stated in general terms, then reviewed in conjunction with FIG. 2. The overall amount of combustion air, i.e., the total air to the regenerator, is controlled based on either a composition of the flue gas or a temperature of the combined flue gas or a differential temperature indicating afterburning downstream of the second fluidized bed. As far as overall control, considering the regenerator as a single stage, this is similar to what happens in U.S. Pat. No. 4,849,091 and in prior art bubbling dense bed regenerators, i.e., air flow is controlled to maintain a small amount of afterburning, usually by dT, or by composition.

Controlling or apportioning the air added to each combustion zone allows unit operation to be optimized even when the operator does not know the individual optima for the first and second stages. If the second fluidized bed, typical a bubbling dense bed with fairly poor contacting efficiency, is being called on to do too much, lots of afterburning, and an increased dT in the flue gas, will occur. The unit can be controlled by increasing the air rate to the coke combustor and decreasing air flow to the second dense bed, and letting the controller keep the relative amount of coke burned in the first and second stages be maintained constant regardless of future fluctuations in coke make.

In the FIG. 2 embodiment, the control scheme apportions air between the first and second stages of the regenerator. This is a more complicated control method than was used in FIG. 1, but will usually allow better operation. An operator may specify e.g., that 40% of the coke will be burned in the first stage and 60% burned in the second stage, regardless of fluctuations in coke make. Several control loops are needed, basically at least one loop to control total air addition to the regenerator based on a measurement of the flue gas from the unit, and one loop to shift air between the first and second stage to keep the relative amounts of coke combustion in each stage constant. The control method can best be understood in conjunction with a review of the Figure.

The total air flow, in line 358 is controlled by means of a flue gas analyzer 361 or preferably by temperature controller 350 and thermocouple 336 which are in the dilute phase region above the second fluidized bed. Either temperature or flue gas composition can be used to generate a control signal which is transmitted via transmission means 352 or 362 (an air line, or a digital or analogue electrical signal or equivalent signal transmission means) to valve 360 which regulates the total air flow to the regenerator via line 358.

The apportionment of air between the primary and secondary stages of regeneration is controlled by the differences in temperature of the two relatively dense phase beds in the regenerator. The temperature (T1) in the coke combustor fast fluidized bed is determined by thermocouple 330. The bubbling dense bed temperature (T2) is determined by thermocouple 332. Both temperature signals are sent to differential temperature controller 338, which generates a signal based on $dT_{12}$, or the difference in temperature between the two beds. Signals are sent via means 356 to valve 372 (primary air to the coke combustor) and via means 354 to valve 72 (secondary air to bubbling dense bed).

If the delta T ($dT_{12}$) becomes too large, it means that not enough coke burning is taking place in the coke combustor, and too much coke burning occurs in the second dense bed. The dT controller 338 will compensate by sending more combustion air to the coke combustor, and less to the bubbling dense bed.

There are several other temperature control points which can be used besides the ones shown. The operation of the coke combustor can be measured by a fast fluidized bed temperature (as shown), by a temperature in the dilute phase of the coke combustor or in the dilute phase transport riser, a temperature measured in the primary cyclone or on a flue gas stream or catalyst stream discharged from the primary cyclone. A flue gas or catalyst composition measurement can also be be used to generate a signal indicative of the amount of coke combustion occurring in the fast fluidized bed, but this will generally not be as sensitive as simply measuring the bed temperature in the coke combustor.

The designations "primary air" and "secondary air" do not require that a majority of the coke combustion take place in the coke combustor. In most instances, the fast fluidized bed region will be the most efficient place to burn coke, but there are considerations, such as reduced steaming of catalyst if regenerated in the bubbling dense bed, and reduced thermal deactivation of catalyst by delaying as long as possible as much of the carbon burning as possible, which may make it beneficial to burn most of the coke with the "secondary air". This will usually require substantial unit modifications, to increase the size of the second fluidized bed, and to increase the bed superficial vapor velocity so that better fluidization is achieved.

It is possible to magnify or to depress the difference in temperature between the coke combustor and the bubbling dense bed by changing the amount of hot regenerated catalyst which is recycled. Operation with large amounts of recycle, i.e., recycling more than 1 or 2 weights of catalyst from the bubbling dense bed per weight of spent catalyst, will depress temperature differences between the two regions. Differential temperature control can still be used, but the gain and/or setpoint on the controller may have to be adjusted because recycle of large amounts of catalyst from the second dense bed will increase the temperature in the fast fluidized bed coke combustor.

The control method of FIG. 2. will be preferred for most refineries. Another method of control is shown in FIG. 3, which can be used as an alternative to the FIG. 2 method. The FIG. 3 control method retains the ability to apportion combustion air between the primary and secondary stages of regeneration, but adjusts feed preheat, and/or feed rate, rather than total combustion air, to maintain partial CO combustion in the coke combustor and complete CO combustion in the second fluidized bed. The FIG. 3 control method is especially useful where a refiner's air blower capacity is limiting the throughput of the FCC unit. Leaving the air blower at maximum, and adjusting feed preheat and/or feed rate, will maximize the coke burning capacity of the unit by always running the air blower at maximum throughput.

In the FIG. 3 embodiment, the total amount of air added via line 358 is controlled solely by the capacity of the compressor or air blower. The apportionment of air between primary and secondary stages of combustion is controlled as in the FIG. 2 embodiment, except that a flue gas dT, rather than a flue gas temperature, is used to adjust coke make. Feed preheat and/or feed rate are adjusted as necessary to keep the coke make in balance with the coke burned in the first stage (partial CO combustion) and in the second stage (complete CO combustion). Each variable changes the coke make of the unit, and each will be reviewed in more detail below.

Feed preheat can control afterburning because of the way FCC reactors are run. The FCC reactor usually operates with a controlled riser top temperature. The hydrocarbon feed in line 1 is mixed with sufficient hot, regenerated catalyst from line 102 to maintain a given riser top temperature. This is the way most FCC units operate. The temperature can be measured at other places in the reactor, as in the middle of the riser, at the riser outlet, cracked product outlet, or a spent catalyst temperature before or after stripping, but usually the riser top temperature is used to control the amount of catalyst added to the base of the riser to crack fresh feed. If the feed is preheated to a very high temperature, and much or all of the feed is added as a vapor, less catalyst will be needed as compared to operation with a relatively cold liquid feed which is vaporized by hot catalyst. High feed preheat reduces the amount of catalyst circulation needed to maintain a given riser top temperature, and this reduced catalyst circulation rate reduces coke make. A constant air supply and a reduced coke make, regardless of the reason for the reduction in coke make, will increase the O2 content of the flue gas.

If the O2 content of the flue gas above the bubbling dense bed increases (or if CO content drops) a composition based control signal from analyzer controller 361 may be sent via signal transmission means 384 to feed preheater 380 or to valve 390. Decreasing feed preheat, i.e., a cooler feed, increases coke make. Increasing feed rate increases coke make. Either action, or both together, will increase the coke make, and bring flue gas composition back to the desired point. A differential temperature control 350 may generate an analogous signal, transmitted via means 382 to adjust preheat and/or feed rate.

The air is apportioned between the first and second stages as in the FIG. 2 embodiment, i.e., a dT controller maintains a temperature difference, which indirectly sets the amount of coke burned in each stage.

The FIG. 3 embodiment provides a good way to accommodate unusually bad feeds, with CCR levels exceeding 5 or 10 wt %. Partial CO combustion, with downstream combustion of CO, in a CO boiler, and constant maximum air rate maximize the coke burning capacity of the regenerator using an existing air blower of limited capacity.

Other Embodiments. A number of mechanical modifications may be made to the high efficiency regenerator without departing from the scope of the present invention. It is possible to use the control scheme of the present invention even when additional catalyst/flue gas separation means are present. As an example, the riser mixer 60 may discharge into a cyclone or other separation means contained within the coke combustor. The resulting flue gas may be separately withdrawn from the unit, without entering the dilute phase transport riser. Such a regenerator configuration is shown in EP A 0259115, published on Mar. 9, 1988 and in U.S. Ser. No. 188,810 which is incorporated herein by reference.

Now that the invention has been reviewed in connection with the embodiments shown in the Figures, a more detailed discussion of the different parts of the process and apparatus of the present invention follows. Many elements of the present invention can be conventional, such as the cracking catalyst, or are readily available from vendors, so only a limited discussion of such elements is necessary.

FCC Feed

Any conventional FCC feed can be used. The process of the present invention is especially useful for processing difficult charge stocks, those with high levels of CCR material, exceeding 2, 3, 5 and even 10 wt % CCR. The process tolerates feeds which are relatively high in nitrogen content, and which otherwise might produce unacceptable NOx emissions in conventional FCC units, operating with complete CO combustion.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids. The present invention is most useful with feeds having an initial boiling point above about 650 F.

FCC Catalyst

Any commercially available FCC catalyst may be used. The catalyst can be 100% amorphous, but preferably includes some zeolite in a porous refractory matrix such as silica-alumina, clay, or the like. The zeolite is usually 5-40 wt. % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt % RE.

Relatively high silica zeolite containing catalysts are preferred for use in the present invention. They withstand the high temperatures usually associated with complete combustion of CO to CO2 within the FCC regenerator.

The catalyst inventory may also contain one or more additives, either present as separate additive particles or mixed in with each particle of the cracking catalyst. Additives can be added to enhance octane (shape selective zeolites, i.e., those having a Constraint Index of 1-12, and typified by ZSM-5, and other materials having a similar crystal structure), adsorb SOX (alumina), remove Ni and V (Mg and Ca oxides).

Additives for removal of SOx are available from catalyst suppliers, such as Davison's "R" or Katalistiks International, Inc.'s "DeSox."

CO combustion additives are available from most FCC catalyst vendors.

The FCC catalyst composition, per se, forms no part of the present invention.

FCC Reactor Conditions

Conventional FCC reactor conditions may be used. The reactor may be either a riser cracking unit or dense bed unit or both. Riser cracking is highly preferred. Typical riser cracking reaction conditions include catalyst/oil ratios of 0.5:1 to 15:1 and preferably 3:1 to 8:1, and a catalyst contact time of 0.5-50 seconds, and preferably 1-20 seconds.

It is preferred, but not essential, to use an atomizing feed mixing nozzle in the base of the riser reactor, such as ones available from Bete Fog. More details of use of such a nozzle in FCC processing are disclosed in U.S. Ser. No. 424,420, which is incorporated herein by reference.

It is preferred, but not essential, to have a riser acceleration zone in the base of the riser, as shown in FIGS. 1 and 2.

It is preferred, but not essential, to have the riser reactor discharge into a closed cyclone system for rapid and efficient separation of cracked products from spent catalyst. A preferred closed cyclone system is disclosed in U.S. Pat. No. 4,502,947 to Haddad et al.

It is preferred but not essential, to rapidly strip the catalyst, immediately after it exits the riser, and upstream of the conventional catalyst stripper. Stripper cyclones disclosed in U.S. Pat. No. 4,173,527, Schatz and Heffley, may be used.

It is preferred, but not essential, to use a hot catalyst stripper. Hot strippers heat spent catalyst by adding some hot, regenerated catalyst to spent catalyst. The hot stripper reduces the hydrogen content of the spent catalyst sent to the regenerator and reduces the coke content as well. Thus, the hot stripper helps control the temperature and amount of hydrothermal deactivation of catalyst in the regenerator. A good hot stripper design is shown in U.S. Pat. No. 4,820,404 Owen, which is incorporated herein by reference. A catalyst cooler cools the heated catalyst before it is sent to the catalyst regenerator.

The FCC reactor and stripper conditions, per se, can be conventional and form no part of the present invention.

Catalyst Regeneration

The process and apparatus of the present invention can use many conventional elements most of which are conventional in FCC regenerators.

The present invention uses as its starting point a high efficiency regenerator such as is shown in the Figures, or as shown. The essential elements include a coke combustor, a dilute phase transport riser and a second fluidized bed, which is usually a bubbling dense bed. The second fluidized bed can also be a turbulent fluidized bed, or even another fast fluidized bed, but unit modifications will then frequently be required. Preferably, a riser mixer is used. These elements are generally known.

Preferably there is quick separation of catalyst from steam laden flue gas exiting the regenerator transport riser. A significantly increased catalyst inventory in the second fluidized bed of the regenerator, and means for adding a significant amount of combustion air for coke combustion in the second fluidized bed are preferably present or added.

Each part of the regenerator will be briefly reviewed below, starting with the riser mixer and ending with the regenerator flue gas cyclones.

Spent catalyst and some combustion air are charged to the riser mixer 60. Some regenerated catalyst, recycled through the catalyst stripper, will usually be mixed in with the spent catalyst. Some regenerated catalyst may also be directly recycled to the base of the riser mixer 60, either directly or, preferably, after passing through a catalyst cooler. Riser mixer 60 is a preferred way to get the regeneration started. The riser mixer typically burns most of the fast coke (probably representing entrained or adsorbed hydrocarbons) and a very small amount of the hard coke. The residence time in the riser mixer is usually very short. The amount of hydrogen and carbon removed, and the reaction conditions needed to achieve this removal are reported below.

| RISER MIXER CONDITIONS | | | |
|---|---|---|---|
| | Good | Preferred | Best |
| Inlet Temp. °F. | 900-1200 | 925-1100 | 950-1050 |
| Temp. Increase, F. | 10-200 | 25-150 | 50-100 |
| Catalyst Residence Time, Seconds | 0.5-30 | 1-25 | 1.5-20 |

-continued
RISER MIXER CONDITIONS

|  | Good | Preferred | Best |
|---|---|---|---|
| Vapor velocity, fps | 5-100 | 7-50 | 10-25 |
| % total air added | 1-25 | 2-20 | 3-15 |
| H2 Removal, % | 5-40 | 10-35 | 12-30 |
| Carbon Removal, % | 1-10 | 2-8 | 3-7 |

Although operation with a riser mixer is preferred, it is not essential, and in many units is difficult to implement because there is not enough elevation under the coke combustor in which to fit a riser mixer. Spent, stripped catalyst may be added directly to the coke combustor, discussed next.

The coke combustor 62 contains a fast fluidized dense bed of catalyst. It is characterized by relatively high superficial vapor velocity, vigorous fluidization, and a relatively low density dense phase fluidized bed. Most of the coke can be burned in the coke combustor. The coke combustor will also efficiently burn "fast coke", primarily unstripped hydrocarbons, on spent catalyst. When a riser mixer is used, a large portion, perhaps most, of the "fast coke" will be removed upstream of the coke combustor. If no riser mixer is used, relatively easy job of burning the fast coke will be done in the coke combustor.

The removal of hydrogen and carbon achieved in the coke combustor alone (when no riser mixer is used) or in the combination of the coke combustor and riser mixer, is presented below. The operation of the riser mixer and coke combustor can be combined in this way, because what is important is that catalyst leaving the coke combustor have specified amounts of carbon and hydrogen removed.

COKE COMBUSTOR CONDITIONS

|  | Good | Preferred | Best |
|---|---|---|---|
| Dense Bed Temp. °F. | 900-1300 | 925-1275 | 950-1250 |
| Catalyst Residence Time, Seconds | 10-500 | 20-240 | 30-180 |
| Vapor velocity, fps | 1-40 | 2-20 | 3.5-15 |
| % primary air added | 40-100 | 50-98 | 60-95 |
| % total air added | 30-95 | 35-90 | 40-80 |
| H2 Removal, % | 40-98 | 45-95 | 50-90 |
| Carbon Removal, % | 25-95 | 30-90 | 35-75 |

The dilute phase transport riser 83 forms a dilute phase which efficiently transfers catalyst from the fast fluidized bed through a catalyst separation means to the second dense bed.

Additional air can be added to the dilute phase transport riser, but usually it is better to add the air lower down in the regenerator, and speed up coke burning rates some.

TRANSPORT RISER CONDITIONS

|  | Good | Preferred | Best |
|---|---|---|---|
| Inlet Temp. °F. | 900-1300 | 925-1275 | 950-1250 |
| Outlet Temp. °F. | 925-1450 | 975-1400 | 1000-1350 |
| Catalyst Residence Time, Seconds | 1-60 | 2-40 | 3-30 |
| Vapor velocity, fps | 6-50 | 9-40 | 10-30 |
| % total air in | 0-30 | 0-20 | 0-5 |
| H2 Removal, % | 0-20 | 1-15 | 2-10 |
| Carbon Removal, % | 0-15 | 1-10 | 2-5 |

Rapid separation of flue gas from catalyst exiting the dilute phase transport riser is still the preferred way to operate the unit. This flue gas stream contains a fairly large amount of steam, from adsorbed stripping steam entrained with the spent catalyst and from water of combustion. Many FCC regenerators operate with 5-10 psia steam partial pressure in the flue gas. In the process and apparatus of one embodiment of the present invention, the dilute phase mixture is quickly separated into a catalyst rich dense phase and a catalyst lean dilute phase.

The quick separation of catalyst and flue gas sought in the regenerator transport riser outlet is very similar to the quick separation of catalyst and cracked products sought in the riser reactor outlet.

The most preferred separation system is discharge of the regenerator transport riser dilute phase into a closed cyclone system such as that disclosed in U.S. Pat. No. 4,502,947. Such a system rapidly and effectively separates catalyst from steam laden flue gas and isolates and removes the flue gas from the regenerator vessel. This means that catalyst in the regenerator downstream of the transport riser outlet will be in a relatively steam free atmosphere, and the catalyst will not deactivate as quickly as in prior art units.

Other methods of effecting a rapid separation of catalyst from steam laden flue gas may also be used, but most of these will not work as well as the use of closed cyclones. Acceptable separation means include a capped riser outlet discharging catalyst down through an annular space defined by the riser top and a covering cap. In older FCC's a reasonably efficient multistage regeneration of catalyst can be achieved by reducing the air added to the coke combustor and increasing the air added to the second fluidized bed. The reduced vapor velocity in the transport riser, and increased vapor velocity immediately above the second fluidized bed, will more or less segregate the flue gas from the transport riser from the flue gas from the second fluidized bed.

In a preferred embodiment, the transport riser outlet may be capped with radial arms, not shown, which direct the bulk of the catalyst into large diplegs leading down into the second fluidized bed of catalyst in the regenerator. Such a regenerator riser outlet is disclosed in U.S. Pat. No. 4,810,360, which is incorporated herein by reference.

Regardless of the method chosen, at least 90% of the catalyst discharged from the transport riser preferably is quickly discharged into a second fluidized bed, discussed below. At least 90% of the flue gas exiting the transport riser should be removed from the vessel without further contact with catalyst. This can be achieved to some extent by proper selection of bed geometry in the second fluidized bed, i.e., use of a relatively tall but thin containment vessel 80, and careful control of fluidizing conditions in the second fluidized bed.

The second fluidized bed achieves a second stage of regeneration of the catalyst, in a relatively dry atmosphere. The multistage regeneration of catalyst is beneficial from a temperature standpoint alone, i.e., it keeps the average catalyst temperature lower than the last stage temperature. This can be true even when the temperature of regenerated catalyst is exactly the same as in prior art units, because when staged regeneration is used the catalyst does not reach the highest temperature until the last stage. The hot catalyst has a relatively lower residence time at the highest temperature, in a multistage regeneration process.

The second fluidized bed bears a superficial resemblance to the second dense bed used in prior art, high efficiency regenerators. There are several important differences which bring about profound changes in the function of the second fluidized bed.

In prior art second dense beds, the catalyst was merely collected and recycled (to the reactor and frequently to the coke combustor) Catalyst temperatures were typically 1250-1350 F., with some operating slightly hotter, perhaps approaching 1400 F. The average residence time of catalyst was usually 60 seconds or less. A small amount of air, typically around 1 or 2% of the total air added to the regenerator, was added to the dense bed to keep it fluidized and enable it to flow into collectors for recycle to the reactor. The superficial gas velocity in the bed was typically less than 0.5 fps, usually 0.1 fps. The bed was relatively dense, bordering on incipient fluidization. This was efficient use of the second dense bed as a catalyst collector, but meant that little or no regeneration of catalyst was achieved in the second dense bed. Because of the low vapor velocity in the bed, very poor use would be made of even the small amounts of oxygen added to the bed. Large fluidized beds such as this are characterized, or plagued, by generally poor fluidization, and relatively large gas bubbles.

In our process, we make the second fluidized bed do much more work towards regenerating the catalyst. The first step is to provide substantially more residence time in the second fluidized bed. We must have at least 1 minute, and preferably have a much longer residence time. This increased residence time can be achieved by adding more catalyst to the unit, and letting it accumulate in the second fluidized bed.

Much more air is added to our fluidized bed, for several reasons. First, we are doing quite a lot of carbon burning in the second fluidized bed, so the air is needed for combustion. Second, we need to improve the fluidization in the second fluidized bed, and much higher superficial vapor velocities are necessary. We also decrease, to some extent, the density of the catalyst in the second fluidized bed. This reduced density is a characteristic of better fluidization, and also somewhat beneficial in that although our bed may be twice as high as a bed of the prior art it will not have to contain twice as much catalyst.

Because so much more air is added in our process, we prefer to retain the old fluffing or fluidization rings customarily used in such units, and add an additional air distributor or air ring alongside of, or above, the old fluffing ring.

| SECOND DENSE BED CONDITIONS | | | |
|---|---|---|---|
| | Good | Preferred | Best |
| Temperature °F. | 1200-1700 | 1300-1600 | 1350-1500 |
| Catalyst Residence Time, Seconds | 30-500 | 45-200 | 60-180 |
| Vapor velocity, fps | 0.5-5 | 1-4 | 1.5-3.5 |
| % total air added | 0-90 | 2-60 | 5-40 |
| H2 Removal, % | 0-25 | 1-10 | 1-5 |
| Carbon Removal, % | 10-70 | 5-60 | 10-40 |

Operating the second fluidized bed with more catalyst inventory, and higher superficial vapor velocity, allows an extra stage of catalyst regeneration, either to achieve cleaner catalyst or to more gently remove the carbon and thereby extend catalyst life. Enhanced stability is achieved because much of the regeneration, and much of the catalyst residence time in the regenerator, is under drier conditions than could be achieved in prior art designs.

CO COMBUSTION PROMOTER

Use of a CO combustion promoter in the regenerator or combustion zone is not essential for the practice of the present invention, however, it may be beneficial. These materials are well-known.

U.S. Pat. No. 4,072,600 and U.S. Pat. No. 4,235,754, which are incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit. Pt can be replaced by other metals, but usually more metal is then required. An amount of promoter which would give a CO oxidation activity equal to 0.3 to 3 wt. ppm of platinum is preferred.

DISCUSSION

The control method of the present invention can be readily added to existing high efficiency regenerators. Most of the regenerator can be left untouched, as the modifications to install differential temperature probes in the regenerator cyclones, or flue gas analyzers, are minor. Usually only minor modifications will be needed in the second dense bed to accommodate the additional combustion air, and perhaps to add extra air rings, and new cyclones.

The riser mixer (if used), the coke combustor, and the dilute phase transport riser require no modification.

The only modification that is strongly recommended for existing high efficiency regenerators is incorporation of a means at the exit of the dilute phase transport riser to rapidly and completely separate catalyst from steam laden flue gas. The steam laden flue gas should be isolated from the catalyst collected in the second fluidized bed. Preferably a closed cyclone system is used to separate and isolate steam laden flue gas from catalyst.

Preferably much, and even most, of the coke combustion occurs in the dry atmosphere of the second fluidized bed. Temperatures in the second fluidized bed are high, so rapid coke combustion can be achieved even in a bubbling fluidized bed.

The process and apparatus of the present invention also permits continuous on stream optimization of the catalyst regeneration process. Two powerful and sensitive methods of controlling air addition rates permit careful fine tuning of the process. Achieving a significant amount of coke combustion in the second fluidized bed of a high efficiency regenerator also increases the coke burning capacity of the unit, for very little capital expenditure.

The process of the present invention gives refiners a way to achieve the benefits of multi-stage catalyst regeneration in a high efficiency catalyst regenerator. We accommodate the inevitable changes in coke make that occur in FCC operation by forcing most of the change to be dealt with in the coke combustor, which is the most robust, and controllable, place to burn coke in an FCC regenerator.

We can limit both coke combustion and afterburning in the coke combustor to a great extent by limiting the amount of combustion air added to the coke combustor, provided the unit does not contain excessive amounts of CO combustion promoter.

Preferably, we change the coke burning characteristics of the coke combustor directly, by controllably limiting the amount of hot regenerated catalyst recycled to the coke combustor from the second fluidized bed. In an extreme case, little or no hot regenerated catalyst is recycle to the coke combustor. Because the incoming catalyst is relatively cool, i.e., is merely at the temperature at which it is withdrawn from the catalyst stripper, carbon burning rates are very low even though there is intense fluidization in the coke combustor. At the generally low temperature which prevails in coke combustors operating without catalyst recycle, there is usually not sufficient residence time to burn more than 10–90% of the coke on spent catalyst, and usually only 20–75% of the coke will be burned in the primary regeneration stage consisting of the coke combustor and the dilute phase transport riser. The relatively low temperatures also hinder to some extent the afterburning of CO to $CO_2$. Thus there will always be a relatively large amount of CO present, whether produced by coke combustion or to a lesser extent by the reaction of $CO_2$ with carbon.

For maximum efficiency, refiners will keep relatively constant operation in the second fluidized bed, and make most of the changes to unit operation occur in the coke combustor. It is also possible to change the operation of the primary and secondary stages of regeneration together, so that the relative amounts of coke burning in each stage remain constant.

By operating in accordance with the teachings of the present invention, refiners will be able to obtain the benefits of coke burning in a generally reducing atmosphere (less NOx, reduced formation of highly oxidized forms of vanadium, lower temperatures, greater coke burning capacity) while having a reliable and responsive way to control the unit which will deal with upsets and other changes which affect the units coke make.

We claim:

1. In a process for regenerating spent fluidized catalytic cracking catalyst comprising:
    a) partially regenerating said spent cracking catalyst in a primary regeneration zone, comprising a fast fluidized bed coke combustor and a superimposed dilute phase transport riser, by charging said spent catalyst to said fast fluidized bed coke combustor having an inlet for spent catalyst, an inlet for recycled regenerated catalyst and an inlet for primary regeneration gas, to produce partially regenerated catalyst and flue gas comprising at least 1.0% CO, which are passed up into the dilute phase transport riser and discharged therefrom to form a flue gas rich stream comprising at least 1.0 mole % CO and a catalyst rich stream comprising partially regenerated catalyst;
    b) completing the regeneration of said partially regenerated catalyst in a secondary regeneration zone comprising a second fluidized bed adapted to receive said partially regenerated catalyst and having means for adding additional regeneration gas to said second fluidized bed in an amount sufficient to complete the regeneration of said catalyst and produce regenerated catalyst and secondary flue gas; the improvement comprising:
        i) maintaining said secondary regeneration zone in full CO combustion regeneration conditions sufficient to produce a secondary flue gas containing less than 1.0 mole % CO and comprising oxygen in an amount sufficient to cause afterburning when mixed with CO containing flue gas discharged from said dilute phase transport riser of said primary regeneration zone;
        ii) combining said CO containing flue gas from said dilute phase transport riser and said secondary flue gas to produce a combined flue gas stream;
        iii) monitoring a flue gas composition or a differential temperature indicating afterburning in said combined flue gas stream and
        iv) controlling the amount of primary regeneration gas to said fast fluidized bed coke combustor to maintain constant said monitored flue gas composition or differential temperature.

2. The process of claim 1 wherein said second fluidized bed comprises a bubbling dense phase fluidized bed.

3. The process of claim 1 wherein a cyclone separator on said dilute phase transport riser outlet is used to separate partially regenerated catalyst from flue gas.

4. In a process for regenerating spent fluidized catalytic cracking catalyst comprising:
    a) partially regenerating said spent cracking catalyst in a primary regeneration zone, comprising a fast fluidized bed coke combustor and a superimposed dilute phase transport riser, by charging said spent catalyst to said fast fluidized bed coke combustor having a bed temperature and an inlet for spent catalyst, an inlet for recycled regenerated catalyst and an inlet for primary regeneration gas, to produce partially regenerated catalyst and flue gas comprising at least 1.0 mole % CO, which are passed up into the dilute phase transport riser and discharged therefrom to form a flue gas rich stream having a temperature and comprising at least 1.0 mole % CO and a catalyst rich stream comprising partially regenerated catalyst;
    b) completing the regeneration of said partially regenerated catalyst in a secondary regeneration zone comprising a second fluidized bed having a bed temperature and adapted to receive said partially regenerated catalyst and having means for adding additional regeneration gas to said second fluidized bed in an amount sufficient to complete the regeneration of said catalyst and produce regenerated catalyst and secondary flue gas having a temperature; the improvement comprising:
        i) maintaining said secondary regeneration zone in full CO combustion regeneration conditions sufficient to produce a secondary flue gas containing less than 1.0 mole % CO and comprising oxygen in an amount sufficient to cause afterburning when mixed with CO containing flue gas discharged from said dilute phase transport riser of said primary regeneration zone;
        ii) combining said CO containing flue gas from said dilute phase transport riser and said secondary flue gas to produce a combined flue gas stream;
        iii) monitoring said combined flue gas stream composition or a differential temperature indicating afterburning, and
        iv controlling the total amount of primary and secondary regeneration gas to maintain constant said monitored combined flue gas composition or differential temperature; and
        v) apportioning the regeneration gas between said primary and secondary stages of regeneration to maintain constant a difference in temperature between said fast fluidized and said second fluidized bed.

5. The process of claim 4 wherein said second fluidized bed comprises a bubbling dense phase fluidized bed.

6. The process of claim 4 wherein a cyclone separator on said dilute phase transport riser outlet is used to separate partially regenerated catalyst from flue gas.

7. In a process for regenerating spent fluidized catalytic cracking catalyst comprising:
   a) partially regenerating said spent cracking catalyst in a primary regeneration zone, comprising a fast fluidized bed coke combustor and a superimposed dilute phase transport riser, by charging said spent catalyst to said fast fluidized bed coke combustor having a bed temperature and an inlet for spent catalyst, an inlet for recycled regenerated catalyst and an inlet for primary regeneration gas, to produce partially regenerated catalyst and flue gas comprising at least 1.0 mole % CO, which are passed up into the dilute phase transport riser and discharged therefrom to form a flue gas rich stream having a temperature and comprising at least 1.0 mole % CO and a catalyst rich stream comprising partially regenerated catalyst;
   b) completing the regeneration of said partially regenerated catalyst in a secondary regeneration zone comprising a second fluidized bed having a bed temperature and adapted to receive said partially regenerated catalyst and having means for adding additional regeneration gas to said second fluidized bed in an amount sufficient to complete the regeneration of said catalyst and produce regenerated catalyst and secondary flue gas having a temperature; the improvement comprising:
      i) maintaining said secondary regeneration zone in full CO combustion regeneration conditions sufficient to produce a secondary flue gas containing less than 1.0 mole % CO and comprising oxygen in an amount sufficient to cause afterburning when mixed with CO containing flue gas discharged from said dilute phase transport riser of said primary regeneration zone;
      ii) combining said CO containing flue gas from said dilute phase transport riser and said secondary flue gas to produce a combined flue gas stream;
      iii) controlling the amount of regenerated catalyst recycled to the coke combustor from the second fluidized bed to control the temperature of said coke combustor and limit the amount of coke burned in said coke combustor to 10 to 90% of the coke on said spent catalyst; and
      iv) controlling the amount of regeneration gas added to said coke combustor and to said dilute phase transport riser to limit afterburning in said combined flue gas stream and produce a flue gas from said dilute phase transport riser containing at least 1.0 mole % CO.

8. The process of claim 7 wherein said second fluidized bed comprises a bubbling dense phase fluidized bed.

9. The process of claim 7 wherein a cyclone separator on said dilute phase transport riser outlet is used to separate partially regenerated catalyst from flue gas.

10. In a process for regenerating spent fluidized catalytic cracking catalyst comprising:
   a) partially regenerating said spent cracking catalyst in a primary regeneration zone, comprising a fast fluidized bed coke combustor and a superimposed dilute phase transport riser, by charging said spent catalyst to said fast fluidized bed coke combustor having an inlet for spent catalyst, an inlet for recycled regenerated catalyst and an inlet for primary regeneration gas, to produce partially regenerated catalyst and flue gas comprising at least 1.0 mole % CO, which are passed up into the dilute phase transport riser and discharged therefrom to form a flue gas rich stream comprising at least 1.0 mole % CO and a catalyst rich stream comprising partially regenerated catalyst;
   b) completing the regeneration of said partially regenerated catalyst in a secondary regeneration zone comprising a second fluidized bed adapted to receive said partially regenerated catalyst and having means for adding additional regeneration gas to said second fluidized bed in an amount sufficient to complete the regeneration of said catalyst and produce regenerated catalyst and secondary flue gas; the improvement comprising:
      i) maintaining said secondary regeneration zone in full CO combustion regeneration conditions sufficient to produce a secondary flue gas containing less than 1.0 mole % CO and comprising oxygen in an amount sufficient to cause afterburning when mixed with CO containing flue gas discharged from said dilute phase transport riser of said primary regeneration zone;
      ii) combining said CO containing flue gas from said dilute phase transport riser and said secondary flue gas to produce a combined flue gas stream;
      iii) monitoring a flue gas composition or a differential temperature indicating afterburning in said secondary flue gas stream; and
      iv) controlling the amount of primary regeneration gas to said fast fluidized bed coke combustor to maintain constant said secondary flue gas composition or differential temperature.

* * * * *